3,848,024
COATING COMPOSITIONS OF POLYESTERURE-
THANES, CARBOXY CONTAINING COPOLY-
MERS AND POLYISOBUTYLENE
Eduard Muck, Otrokovice, Jaroslav Strachota, Moravou, and Josef Horak, Gottwaldov, Czechoslovakia, assignors to Statni Vyzkumny ustav Kozedelny, Gottwaldov, Czechoslovakia
No Drawing. Continuation of application Ser. No. 118,572, Feb. 24, 1971. This application Nov. 21, 1972, Ser. No. 308,322
Claims priority, application Czechoslovakia, Mar. 5, 1970, 1,481/70
Int. Cl. C08g 41/04
U.S. Cl. 260—859
9 Claims

ABSTRACT OF THE DISCLOSURE

Core and surface layers for artificial leather are prepared from coating or impregntaing compositions which are solutions in a water soluble organic medium or a major amount of polyurethane elastomer and a minor amount of a copolymer of maleic, fumaric, crotonic, cinnamic, itaconic, or citraconic acid, alkali metal or ammonium salts, lower alkyl esters, anhydrides, monoamides, or mononitriles of said acids with various ethylenically unsaturated monomers. The copolymer improves the mechanical strength and vapor permeability of the product.

---

This invention relates to coating and impregnating compositions, and particularly to compositions suitable as impregnating agents for core layers of leather substitutes and as coating agents forming the surface of such substitutes.

It is known to prepare leather substitutes by impregnating a fibrous, flexible web or fabric with a resin solution in a water-soluble organic solvent, and to coat the core layer so produced with the same or another resin solution. When the solvent is removed by replacement with water, the resinous material gels, and the gel becomes microporous open drying. The size and number of the pores depend partly on the manipulative procedures employed, and partly on the nature of the coating and impregnating compositions. While compositions available heretofore permitted a commercially acceptable leather substitute to be prepared, the known substitutes are inferior to natural leather in their permeability for air and water vapor, and also in part in their mechanical stength.

It is a primary object of this invention to provide improved coating and impregnating compositions, particularly for use in the manufacture of leather substitutes.

Elastomeric polyurethane resins have been employed heretofore in such compositions, and attempts have been made to improve the quality of the product so obtained by modifying the polyester resin by admixture of other polymers, hereinafter generally referred to as synthetic resins.

It has now been found that the mechanical properties of shaped bodies of polyurethane elastomer can be improved significantly by intimately mixing the elastomer with a copolymer having repeating units of a first monomer which is an acid of the formula

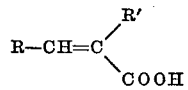

or an alkali metal or ammonium salt, lower-alkyl monoester, anhydride, monoamide, or mononitrile of the acid, and repeating units of a second monomer which is lower alkylene, lower alkylidene, chloroprene, styrene, stilbene, isostilbene, vinyl alcohol, vinyl acetate, vinyl chloride, vinyl loweralkyl ether, allyl acetate lower alkyl acrylate, lower alkyl methacrylate, acrylonitrile, or methacrylonitrile.

In the above formula, R may be hydrogen, methyl, phenyl, or carboxyl, and R' hydrogen, methyl, or

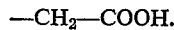

The mole ratio of the units of the first and second monomer in the copolymer may vary between 15:85 and 50:50. The copolymer may be used in any amount sufficient to produce an improvement in the mechanical properties of the ultimately obtained shaped body of elastomer and copolymer, but the amount of the polyurethane elastomer must be at least equal to the amount of the copolymer.

Representative acids of the above formula are maleic, fumaric, crotonic, cinamic, itaconic, and citraconic acid. Representative lower alkylenes suitable as second monomers are ethylene, propylene, isobutylene, a suitable lower alkylidene is butadiene.

Copolymers of the two types of monomers have been prepared heretofore by radical polymerization in aqueous media in which the monomers were dispersed as separate phases of an emulsion or suspension, or as solutes, and block copolymerization and solution polymerization in organic solvents have been used successfully. Some of the copolymers are staple articles of commerce, and those not prepared heretofore, if any, are readily obtained by procedures fully familiar to those skilled in the art.

The copolymers suitable for the purposes of the invention may contain units of a third monomer, and we have used successfully ternary polymers of maleic anhydride, vinylidene chloride, and acrylonitrile, of itaconic acid, and lower alkyl methacrylates of fumaric acid, vinyl chloride, and vinyl acetate, of maleic anhydride, vinylidene chloride, and methyl methacrylate, and of maleic anhydride, vinylidene chloride, and lower alkyl acrylates.

When the binary or ternary copolymers of the invention are combined even in minor amounts with polyurethane elastomers in impregnating and coating compositions, the leather substitutes obtained have significantly greater mechanical strength, better permeability to air and water vapor, and superior sorption and desorption of water vapor, the substitutes prepared according to this invention being almost equal to natural leather with respect to the last-mentioned property.

The pliability or toughness of a core layer produced by impregnation of a fibrous web or fabric with the compositions of this invention may be modified by varying the ratio of polyurethane elastomer and copolymer within the limits indicated above. Poly-lower-alkylenes of relatively low molecular weight when admixed to the other ingredients by dispersion in the solvent medium increase the softness and pliability of the leather substitute, and thereby improve its touch and hand. Polyisobutylene has been found superior to other polyalkylenes for this purpose, and it may be employed in amounts of up to 50% of the resin content of an impregnating composition.

When surface layers are prepared by coating the impregnated fibrous web or other flexible core layers with compositions of the invention, the porosity of the surface layer and its mechanical strength are improved, and the permeability of the layer is much better than that of a corresponding layer formed without the copolymer. Two compositions of the invention respectively employed as an impregnating agent for the core layer and as a coating composition for forming a surface layer adhere perfectly to each other.

The poly-lower-alkylene referred to above may be employed for modifying the properties of the surface layer in a manner analogous to their effect in core layers. Not more than 20% of the polyalkylene is normally used in surface layers.

If desired, the compositions of the invention may be mixed with inert fillers and/or materials insoluble in the solvent system employed, such as cork chips, leather powder, polyvinyl chloride, or polystyrene, the effect of such admixtures being predictable.

The leather substitutes prepared by means of the coating compositions of the invention have been used successfully in shoes and other garments, but also as upholstery materials.

The following Examples are further illustrative of this invention. In the Examples and throughout the specification as well as in the appended claims, all parts and percents are by weight unless otherwise stated.

Example 1

A core layer for a leather substitute was prepared by first impregnating a non-woven fabric of collagen and polypropylene fibers with a solution containing 13.6 parts of a polyurethane elastomer which is a reaction product of 1.00 equivalent parts of polypropylene oxide having a mol. wt. of 1800 and 2.00 equivalent parts of 1,4-butanediol with 3.15 equivalent parts of tolylene diisocyanate which is, for example, the commercial product sold under the name of Estane 5714 by B. F. Goodrich Chemical Co. 2.5 parts of an acrylonitrile-maleic anhydride copolymer which contains approximately a 1:1 molar ratio of the comonomers and has a mol. wt. of 30,000, 0.9 parts of polyisobutylene oil having a mol. wt. of 900 and 83 parts of dimethylformamide. The fabric was immersed in the solution until saturated and was then passed between rollers to reduce the solution pick-up until the resin content was 35% of the combined weight of resin and dry fabric.

The impregnated fabric was washed in running water until the solvent was removed, thereby precipitating a resin gel. The washed product was dried at 115° C. for three minutes.

The microporous core layer so produced had better mechanical strength and greater permeability for air and water vapor than an otherwise similar layer prepared from the same fabric base with a resin solution in which the copolymer was omitted. It came close to the permeability of the natural leather.

Example 2

The procedure of Example 1 was repeated with a dimethylformamide solution of a resin mixture consisting of 7.2 parts of the polyurethane elastomer employed in Example 1, 7.2 parts of an ethylene-maleicanhydride copolymer containing approximately a 1:1 molar ratio of comonomers having a mol. wt. of 10,000 and 3.6 parts of polyisobutylene oil having a mol. wt. of 2000 dissolved in 82 parts of dimethylformamide.

The excess of the resin solution was squeezed out of the fabric base to provide a resin content of 45% in the finished core layer.

The product differed from that of Example 1 by higher flexibility while the remaining properties were the same.

Example 3

Yet another core layer for a leather substitute was prepared in a manner analogous to those of the foregoing Examples and from the same non-woven fabric with the following resin solution: 15 parts of the polyurethane elastomer used in Example 1, 1.5 parts of an allyl acetate-ammonium fumarate copolymer which is the reaction product from the copolymerisation of equimolar quantities of the allyl acetate monomer with fumaric acid and in which the carboxylic groups in the product were neutralized with aqueous ammonia to pH 8.5 and which has a mol. wt. of 10,000 and 0.5 parts polyisobutylene oil having a mol. wt. of 900, all of the components being dissolved in 83 parts dimethylsulphoxide.

The resin was squeezed out of the fabric to provide a content of 35% of resin mixture, based on the combined dry weight of the core layer and resin.

The physical properties of the final product were comparable to those of Example 1.

Example 4

A solution suitable for preparing a surface coating on the core layers described in the preceding Examples or on other flexible sheet material was mixed in accordance with the following: 17.5 parts of a polyurethane elastomer which is the reaction product of 1.00 equivalent parts of polyethylene adipate having a mol. wt. of 1500 and 2.00 equivalent parts of 1,3-butanediol with 3.20 equivalent parts of 4,4-diphenylmethane diisocyanate which is a polyester-urethane product sold as Estane 5701–F1 by B. F. Goodrich Chemical Co., 2 parts of an ethylene-maleic anhydride copolymer as employed in Example 2 and 0.5 parts of polyisobutylene oil having a viscosity of 500 cp. at 20° C., all of the constituents being dissolved in 80 parts dimethylformamide by means of a high-speed stirrer.

The solution was cast on a moving metal belt coated with silicon rubber to form a uniform layer 0.3 mm. thick. The belt carrying the solution was passed through water to coagulate the resin and remove the solvent, and the film so produced was dried and stripped from the substrate.

Its tensile strength was 10% higher than that of a film produced from the polyurethane alone under otherwise identical conditions. The film of the invention also had much greater water vapor permeability than the unmodified polyurethane film. It showed similar advantages when applied to the core layers in a manner conventional in itself and obvious from the above.

Example 5

The homogeneity of the film produced in Example 4 according to the invention, and the surface finish and touch of a leather substitute surfaced therewith were further improved when the coating solution additionally contained 0.6 parts of a plasticizing agent of the following composition:

100 parts polyisobutylene oil as employed in Example 3, 3 parts alkyl glycol ether which is a reaction product of 1.0 equivalent parts of a linear aliphatic $C_8$ to $C_{10}$ alcohol with 5.0 equivalent parts of ethylene oxide, that is, the commercial product Slovasol SF of Slovchemia, Bratislava and 0.2 parts of polyvinylalcohol having a mol. wt. of 40,000 in 30 parts water.

Slovasol is an ethylene oxidized to higher aliphatic alcohol $C_8$–$C_{10}$.

Slovial is a 20% aqueous dispersion of polyvinyl alcohol, M.W. 40,000.

Estane 5714 is a linear polyurethane of the polyether type, Durometer reading Shore A80.

Estane 5701 F1 is a polyesterurethane, Durometer reading Shore A88.

Both Estane 5714 and Estane 5701 F1 are absolutely non-reactive, thermoplastic polyurethanes.

Slovasol SF and Sloviol R are respectively trademarks of Chemicke zavody Wilhelma Piecka, Novaky, Czechoslovakia, listed in the Catalog of Products, issued by the company in 1967 under catalog numbers TPD 10–043–61 and TPD 10–084–63.

Estane is described in U.S. 3,660,218 issued May 2, 1972.

Example 6

The procedure of Example 4 was modified by the use of a coating solution prepared as follows: 18.5 parts of the polyurethane elastomer employed in Example 4, 4.5 parts of a vinylacetate monobutylfumarate copolymer containing approximately a 1:1 molar ratio of both comonomers, 0.8 parts of the plasticizing agent employed in Example 5, and 82 parts dimethylformamide. Prior to casting the film, 1 part tannery waste essentially consisting of powder abraded from chrome tanned leather by buffing was suspended in the solution by means of a high-speed stirrer.

The cast film was more similar to natural leather than the products obtained in Examples 4 and 5, and its water vapor permeability was 10% to 15% higher than that of the polyurethane film prepared as a control in Example 4, Example 7

A coating composition was prepared in accordance with the following: 18.5 parts of the polyurethane elastomer used in Example 4, 1.5 parts of a methylacrylate-maleic anhydride copolymer which is the reaction product from the copolymerization of equimolar quantities of both comonomers and having a mol. wt. of 25,000, 5.0 parts of polyvinyl chloride powder, 4.5 parts of dioctyl phthalate and 0.5 parts of polyisobutylene oil having a mol. wt. of 2200, were all plasticized in 65 parts dimethylformamide. The ingredients were stirred into a paste by means of a high-speed mixer, and the paste was spread on the metal belt by means of an applicator and further processed as described in Example 4.

The film so produced had about the same mechanical properties as those obtained in Examples 4 to 6.

Elastomeric polyurethanes other than the commercial products referred to above have been substituted in the procedures of the illustrative Examples with such relatively minor changes in the properties of the product obtained as could be expected from the nature of the specific resins employed.

Maleic anhydride and the alkali metal salts and lower alkyl esters of fumaric acid in the copolymers described in these Examples have been replaced successfully by analogous derivatives of crotonic, cinnamic, itaconic, and citraconic acid, and the corresponding mononitriles. These compounds were copolymerized not only with the acrylonitrile, methyl acrylate, vinyl and allyl acetate, and ethylene referred to in the Examples, but also with butadiene, styrene, esters of acrylic and methacrylic acid with lower alkanols having more than one carbon atom, methacrylonitrile, stilbene, isostilbene, vinyl alcohol, vinyl chloride, vinyl lower-alkyl ethers, and chloroprene.

Conventional mats of the woven or non-woven type of collagen and/or polypropylene composition are readily available. Some are described for example, in copending application Ser. No. 845,983, Kremr et al.

Various modifications may be made to the present process and various forms of compositions may be obtained. These, of course, will be obvious to those skilled in the art and therefore, the present description is to be taken as illustrative only of the invention.

What is claimed is:

1. A polyurethane based elastomeric coating and impregnating composition consisting essentially of (a) a linear thermoplastic polyester-urethane elastomer having a Shore Hardness reading of about 80–90, (b) about an equimolar amount based on the repeating unit of said elastomer of a copolymer of (1) a monomer selected from the group consisting of an alpha,beta-unsaturated polycarboxylic acid having the formula

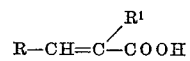

wherein R' is hydrogen, methyl, phenyl or carboxyl and $R^1$ is hydrogen, methyl or methylcarboxyl, an alkali salt of said acid, an ammonium salt of said acid, a lower alkyl monoester of said acid, an anhydride of said acid, a monoamide of said acid and a mononitrile of said acid with (2) a monomer selected from the group consisting of lower olefins, lower diolefins, chloroprene, styrene, stilbene, isostilbene, vinyl alcohol, vinyl acetate, vinyl lower alkyl ethers, alkyl acetate, lower alkyl acrylates and methacrylates, acrylonitrile and methacrylonitrile, wherein components (1) and (2) of the copolymer are present in mol ratios of 15:85 to 50:50, and (c) an organic solvent medium for the elastomer (a) and the copolymer (b) having dispersed therein 4.0% to 50% polyisobutylene based on the weight of the elastomer (a) and the copolymer (b).

2. A composition as set forth in claim 1, wherein said acid is chosen from the class consisting of maleic, fumaric, crotonic, cinnamic, itaconic, or citraconic acid.

3. A composition as set forth in claim 1, wherein said solvent medium is readily soluble in water.

4. A method of preparing a core layer for a leather substitute which comprises impregnating a flexible fibrous sheet material with the composition set forth in claim 1 and thereafter removing said solvent medium.

5. A method of preparing a leather substitute which comprises coating flexible sheet material with the composition set forth in claim 1 and thereafter removing said solvent medium.

6. A method as set forth in claim 5 wherein said sheet material is prepared by impregnating a fibrous web with said composition.

7. A composition according to claim 1 wherein component (1) is selected from the group consisting of maleic anhydride, ammonium fumarate and monobutylfumarate, component (2) is selected from the group consisting of acrylonitrile, ethylene, allyl acetate, vinyl acetate and methacrylate and the ratio of component (a) to component (b) is 1:1 to 9:1.

8. A composition according to claim 1 wherein said solvent medium is dimethylformamide.

9. A synthetic leather article comprising a fibrous sheet material coated with the composition of claim 1.

References Cited

UNITED STATES PATENTS

| | | | |
|---|---|---|---|
| 3,271,342 | 9/1966 | Kuhn | 260—859 R |
| 3,426,099 | 2/1969 | Freifeld | 260—859 R |
| 3,427,192 | 2/1969 | Bolinger | 260—859 R |
| 3,441,365 | 4/1969 | Lowell | 260—859 R |
| 3,617,361 | 11/1971 | Reinhard | 260—859 R |
| 3,668,274 | 6/1972 | Owens | 260—859 R |
| 3,719,726 | 3/1973 | Hara | 260—859 R |

PAUL LIEBERMAN, Primary Examiner

U.S. Cl. X.R.

117—138.8 A, 138.8 E, 141, 161 KP; 260—78.5 R, 78.5 T